United States Patent
Ince

(10) Patent No.: US 7,488,114 B2
(45) Date of Patent: Feb. 10, 2009

(54) ROLLING BEARING RETAINER

(75) Inventor: Marion J. Ince, Mount Holly, NC (US)

(73) Assignee: INA-Schaeffler, Herzogenaurach (DE)

( * ) Notice: Subject to any disclaimer, the term of this patent is extended or adjusted under 35 U.S.C. 154(b) by 640 days.

(21) Appl. No.: 10/543,451

(22) PCT Filed: Dec. 20, 2003

(86) PCT No.: PCT/EP03/14688

§ 371 (c)(1), (2), (4) Date: Aug. 9, 2005

(87) PCT Pub. No.: WO2004/067980

PCT Pub. Date: Aug. 12, 2004

(65) Prior Publication Data

US 2006/0140526 A1      Jun. 29, 2006

(51) Int. Cl.
*F16C 33/54*      (2006.01)
(52) U.S. Cl. .................. 384/572; 384/575; 384/580
(58) Field of Classification Search ........... 384/572, 384/575, 580

See application file for complete search history.

(56) References Cited

U.S. PATENT DOCUMENTS 3,438,685 A * 4/1969 Teufel .................. 384/575
3,787,104 A     1/1974 Alling

FOREIGN PATENT DOCUMENTS

| DE | 567 829 | 1/1933 |
|----|---------|--------|
| DE | 802 668 | 1/1951 |
| DE | 931 684 | 2/1955 |
| DE | 931 684 C | 8/1955 |
| DE | 2333237 C2 | 1/1974 |
| DE | 3603413 A1 | 8/1987 |
| DE | 196 197 12 A1 | 11/1996 |
| DE | 198 35 261 A1 | 2/1999 |
| FR | 22 12 878 | 7/1974 |

* cited by examiner

*Primary Examiner*—William C Joyce
(74) *Attorney, Agent, or Firm*—Charles A. Muserlian

(57) ABSTRACT

A rolling bearing retainer (1) for a cylindrical roller bearing is characterized by the fact that a web center part (4.2) is provided with a respective projection (4.3) on a circumferential side, and these projections (4.3), by twisting this web center part (4.2) about its longitudinal axis (4.5), are formed into holding lugs which in each case separate two adjacent cylindrical rollers (6) from one another and prevent the latter from falling out in a radial direction.

4 Claims, 5 Drawing Sheets

US 7,488,114 B2

ROLLING BEARING RETAINER

This application is a 371 of PCT application EP2003/014688 filed Dec. 20, 2003.

FIELD OF APPLICATION OF THE INVENTION

The invention relates to a rolling bearing retainer for a cylindrical roller bearing, which rolling bearing retainer consists of two side rings which are connected to one another by axially running webs uniformly spaced apart in the circumferential direction, so that pockets are formed for accommodating cylindrical rollers, the webs being at least partly twisted by being rotated by about 90° about their longitudinal axes, so that the cylindrical rollers are prevented from falling out of the retainer.

BACKGROUND OF THE INVENTION

The load rating of rolling bearings, inter alia, also depends to a considerable extent on the number of rolling elements. Full-type rolling bearings contain the largest possible number of rolling elements and therefore provide a theoretical optimum load rating. A disadvantage of full-type rolling bearings is the higher friction. On account of this greater dissipation loss in the bearing, the speed limit of the bearings drops to about half the value of cylindrical roller bearings with retainers.

In order to eliminate these disadvantages, it has been conventional practice for a long time to dispense with a maximum number of rolling elements and to use the space thus obtained, compared with a full-type design, for a retainer. Thus, although it is possible for conventional cylindrical rollers with retainers to be operated at higher speeds, a reduced number of cylindrical rollers and thus a reduction in the load rating must be tolerated on account of the space required for the retainer.

Such a rolling bearing has been previously disclosed by DE 931 684. Its cylindrical rollers are accommodated in a sheet-metal retainer of the generic type, the webs of which are provided with projections which are twisted in a radial direction, so that adjacent rolling elements in the region of the pitch circle are separated from one another by the sheet thickness. However, this sheet-metal retainer is made of a thin material, so that it cannot be used at all in a bearing which is subjected to very high loads. Another disadvantage consists in the fact that there is a relatively large distance between two adjacent rolling elements in the circumferential direction. This distance is composed of the actual web width and the bent-over projections. There is also the fact that the bending radii of the bent-over projections additionally increase this web width even further.

Another retainer of the generic type having twisted webs has be previously disclosed by DE 36 03 413 A1. This retainer is likewise produced from sheet metal and has webs which extend with their axial ends into the side rings over part of the width of the latter and are radially oriented by being rotated by 90° about their axes. In addition, the webs have holding lobes which are bent alternately into the one or the other adjacent pocket. In this case, these holding lobes are defined by radial notches which are already provided in the flat state of the retainer strip. This retainer, too, has the disadvantage of very low stability.

DESCRIPTION OF THE INVENTION

The object of the invention is to improve a retainer of the generic type having at least partly twisted web parts in such a way that it has sufficient stability in the pitch circle region despite a small web width.

According to the invention, this object is achieved with a rolling bearing retainer for a cylindrical roller bearing, which rolling bearing retainer comprising two side rings which are connected to one another by axially running webs uniformly spaced apart in the circumferential direction, so that pockets are formed for accomodating cylindrical rollers, the webs being at least partly twisted by being rotated by about 90° about their longitudinal axes, so that the cylindrical rollers are prevented from falling out of the retainer, a respective projection is arranged in a center part of the webs on a circumferential side, and these projections, by twisting this web center part about its longitudinal axis, are formed into holding lugs which, with regard to a bearing center point, extend in the bent-over state beyond a pitch circle radius and in each case separate two adjacent cylindrical rollers from one another and prevent the cylindrical rollers from falling out in a radial direction, these radially oriented holding lugs, via two respective twisted parts adjoining on both sides in the axial direction, being connected to a respective outer non-twisted web part, these web parts being arranged outside the pitch circle and preventing the cylindrical rollers from falling out in the other radial direction.

In this way, a retainer of high strength and low weight is provided, and this retainer has a high load rating on account of a maximum number of cylindrical rollers being accommodated. It is possible to accommodate a large number of cylindrical rollers because, by the web center part being twisted by about 90°, it is only the retainer material thickness used that keeps adjacent cylindrical rollers at a distance apart in the circumferential direction. That is to say the circumferential distance from cylindrical roller to cylindrical roller is very small. At the same time, however, this small distance in the circumferential direction provides for high stability of the retainer, since the webs have sufficient spatial extent in the radial direction. A further advantage of this retainer of the generic type lies in the fact that a roller ring can be formed by the internal and the external retention, and this roller ring can be readily manipulated due to the positive-locking retention of the cylindrical rollers.

Further advantageous configurations of the retainer according to the invention are described in the subclaims.

Thus, provision is made for the holding lugs to be reduced in their thickness compared with the other web parts. As a result, even more spaced is provided for the cylindrical rollers accomodated in pockets, since the circumferential distance from cylindrical roller to cylindrical roller is ensured by this material thickness, which is reduced once again, while at the same time the strength is not reduced.

According to a further feature of the invention, the rolling bearing retainer is to be formed from a sheet-metal strip, the ends of which, after the pockets have been stamped out and after the projections arranged on the webs have been twisted, are bent in a circular shape to form holding lugs and are connected to one another by a welding operation.

According to a further additional feature of the invention, the rolling bearing retainer is to be formed from a tubular hollow body whose pockets are stamped out and whose projections arranged on the webs are formed by twisting them into holding lugs.

The rolling bearing retainer is to be arranged in a planet bearing in an automatic transmission for a motor vehicle, provision being made for it to be externally guided.

The invention is explained in more detail below with reference to exemplary embodiments.

DETAILED DESCRIPTION OF THE DRAWINGS

Figure 1:
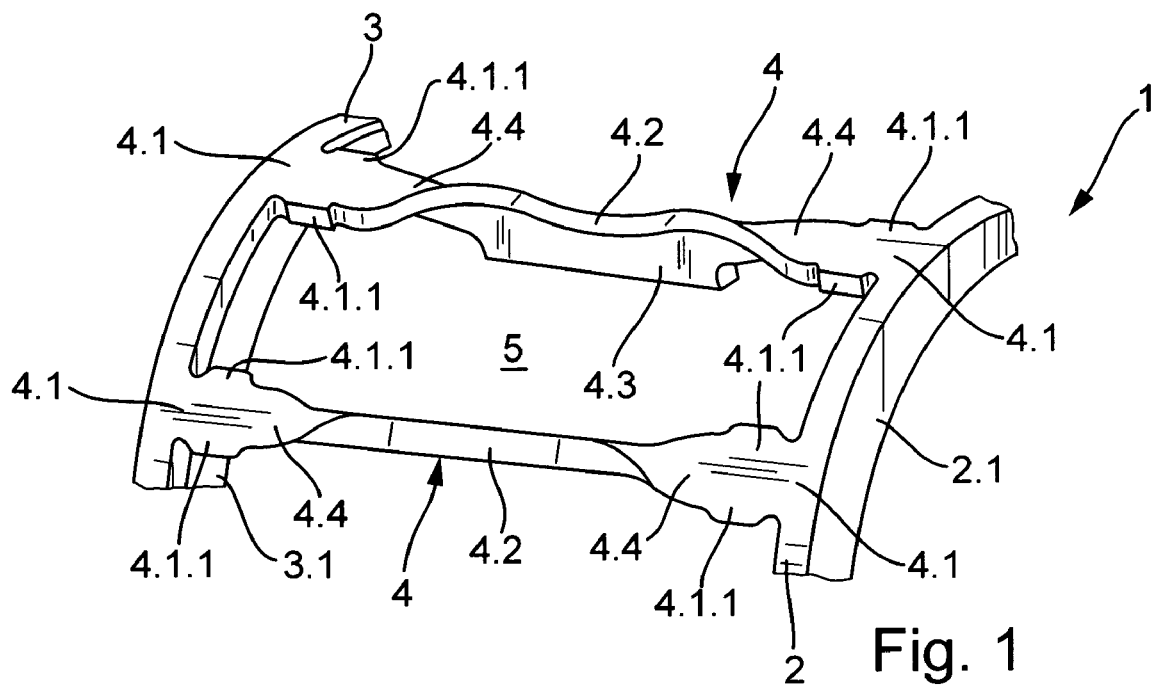
FIG. 1 shows detail of a perspective illustration of a retainer according to the invention.

The rolling bearing retainer according to the invention, shown in FIG. 1 in detail in a perspective illustration and designated by 1, consists of the side rings 2 and 3, which are provided with flanges 2.1 and 3.1 directed radially inward and are connected to one another by webs 4. In this way, pockets 5 are formed for accommodating rolling elements 6, which are not shown for the sake of clarity. As said figure also shows, the individual webs 4 consist of a plurality of parts. Directly adjoining the two side rings 2, 3 is a respective outer web part 4.1, which has the same radial extent as the side rings 2 and 3. With part of the lateral surface of the side rings 2, 3 and part of the lateral surface of the outer web ring 4.1, an externally guided retainer would rest in place in a locating bore (not shown) of an any desired connecting construction.

Figure 9:
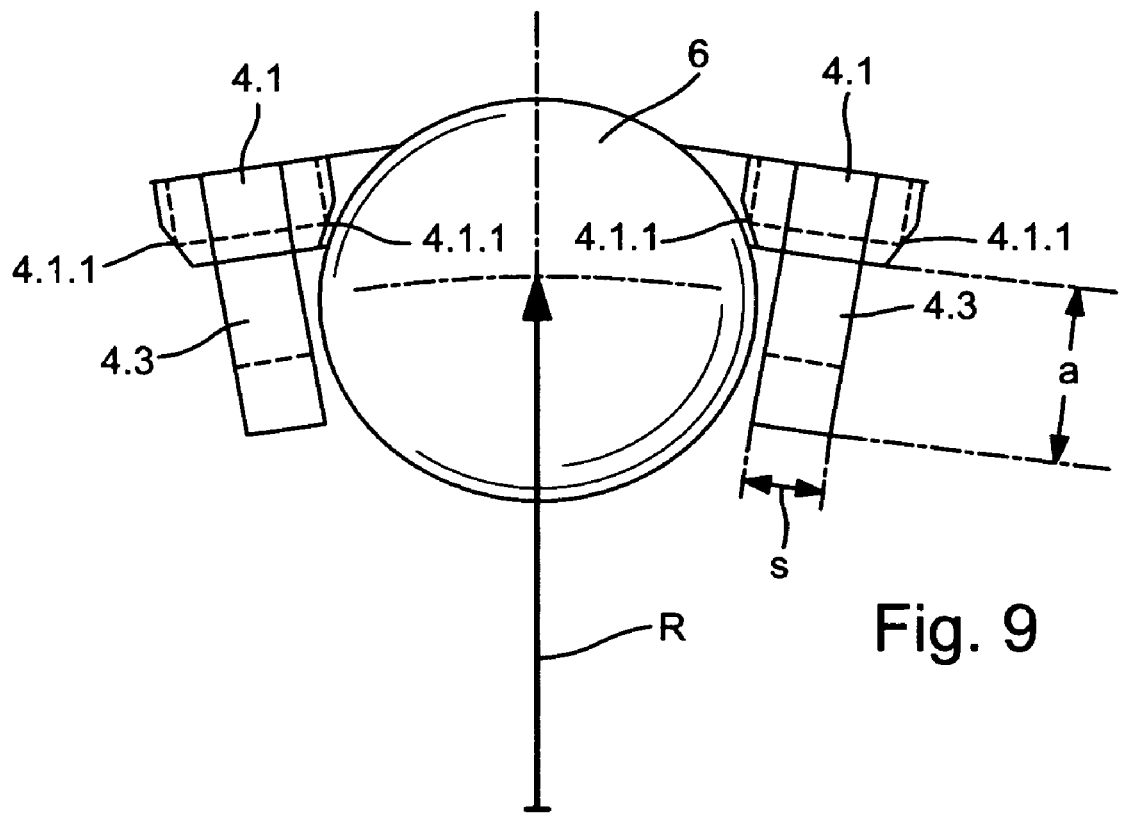
FIG. 9 shows an enlarged illustration of a section along line IX-IX in FIG. 8.

Each web 4 has a web center part 4.2, which in the non-twisted state is extended by a projection 4.3 on a circumferential side. The projection 4.3 is oriented radially inward by twisting it by about 90° about the center line 4.5 of this web center part 4.2, so that two adjacent projections 4.3, spaced apart in the circumferential direction of a finished retainer 1 act as holding lugs which prevent the cylindrical rollers 6 from falling out radially inward. These holding lugs are arranged inside the pitch circle R. The pitch circle R is depicted in FIG. 9. In this case, the web center part 4.2 must be twisted in such a way that the two outer web parts 4.1 are not changed in their position. This means that this twisting of the web center part 4.2 forms two web parts 4.4 which absorb the twisting and connect this web center part 4.2 to the two outer web parts 4.1. The outer web parts 4.1 are provided with holding lugs 4.1.1 on both sides, so that the cylindrical rollers 6 are prevented from falling out radially outward. The holding lugs 4.1.1 are arranged outside the pitch circle R.

In a modification of FIG. 1, it is also possible for the two outer non-twisted web parts 4.1 to be arranged on the radially inner end of the flanges 2.1, 3.1. Due to the twisting of the web center part 4.2, the cylindrical rollers 6 are prevented from falling out radially outward by the projections 4.3. The cylindrical rollers are prevented from falling out radially inward by the holding lugs 4.1.1. In this case, the holding lugs produced by twisting the web center part 4.2 lie outside the pitch circle R and holding lugs 4.1.1 lie inside the pitch circle R.

Figure 2:
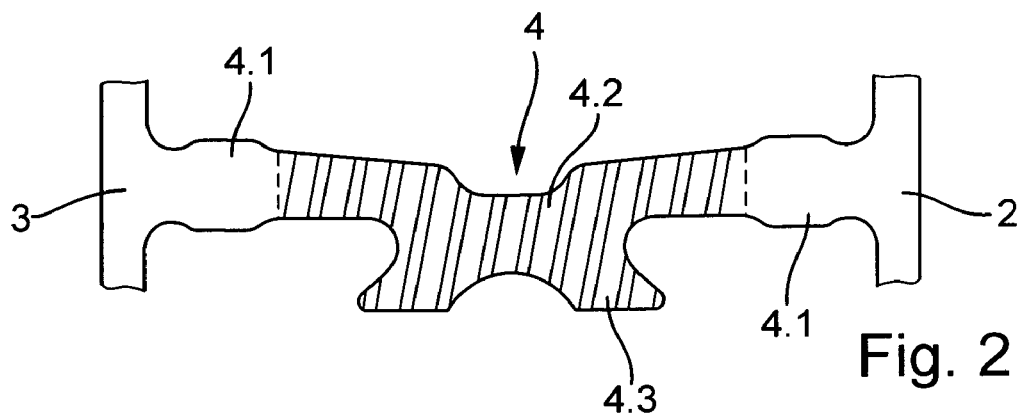
FIG. 2 shows a plan view of a web with integrally formed projection in the state in which the latter is not bent over.
Figure 3:
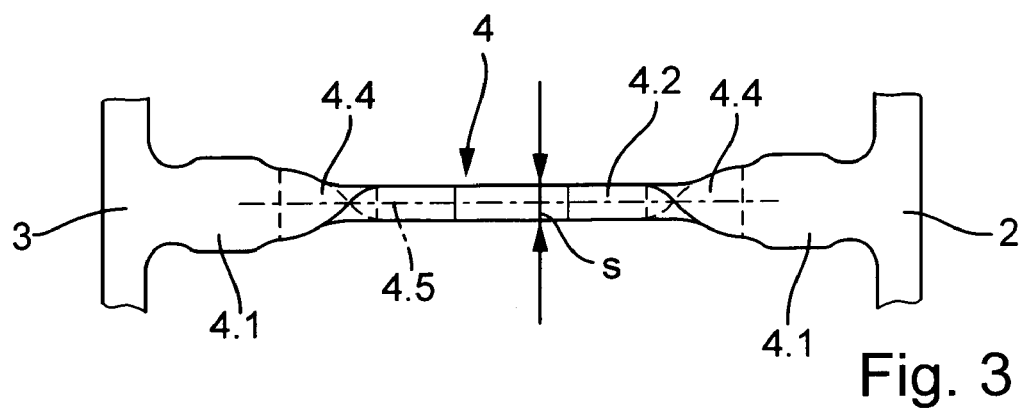
FIG. 3 shows a plan view of a web in the bent-over state.

It can be seen from FIG. 2 that, in principle, the projection 4.3 may have any desired shape, and FIG. 3 shows that the circumferential spacing of adjacent cylindrical rollers 6 is influenced merely by the material thickness s used. The smaller the magnitude s, the greater the number of cylindrical rollers 6 that can be accommodated in the retainer 1 and the greater the load-bearing capacity of the bearing. If material of varying thickness is now used within the axial extent of a web 4 as illustrated in FIG. 2 by the hatched area, the material thickness s in the circumferential direction can be reduced again. In other words, the area identified by the hatching should have a material thickness s which is smaller than the thickness s of the rest of the material.

Figure 4:
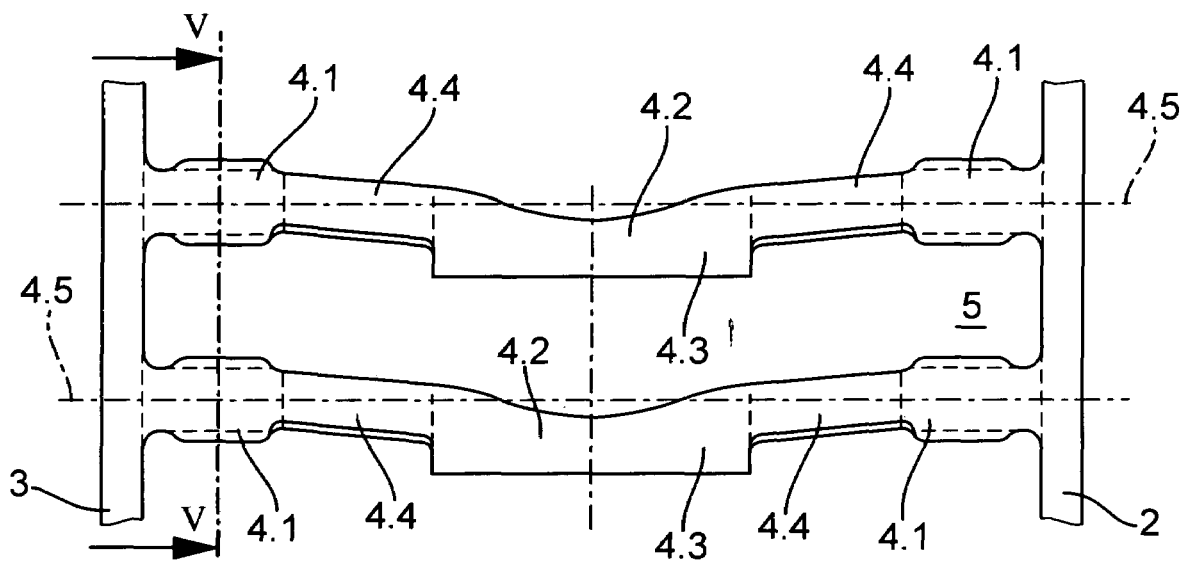
FIG. 4 shows a detail from a plan view of a profiled sheet-metal strip with a non-twisted web part.
Figure 5:
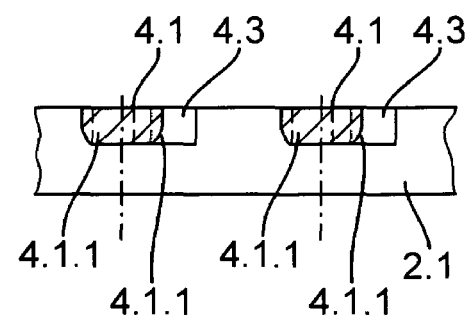
FIG. 5 shows a cross section along line V-V in FIG. 4.

The production of a retainer 1 according to the invention from a flat strip is shown in FIGS. 4 to 8. As FIG. 4 shows, first of all the webs 4 are stamped in the flat strip, so that pockets 5 for accommodating the cylindrical rollers 6 are formed. The strip has been profiled beforehand in such a way that side rings 2, 3 with flanges 2.1, 3.1 bent at right angles are formed. The webs 4 have the center part 4.2 which is provided with the projection 4.3. This web center part 4.2 is connected via two web parts 4.4 to the outer web parts 4.1, adjoining which are the side rings 2, 3. As FIG. 5 shows, the projections 4.3 have still not been bent over after the stamping. The subsequent holding lugs 4.1.1 can clearly be seen at the outer web parts 4.1, these holding lugs 4.1.1 being intended to prevent the cylindrical rollers 6 from falling out radially outward.

Figure 6:
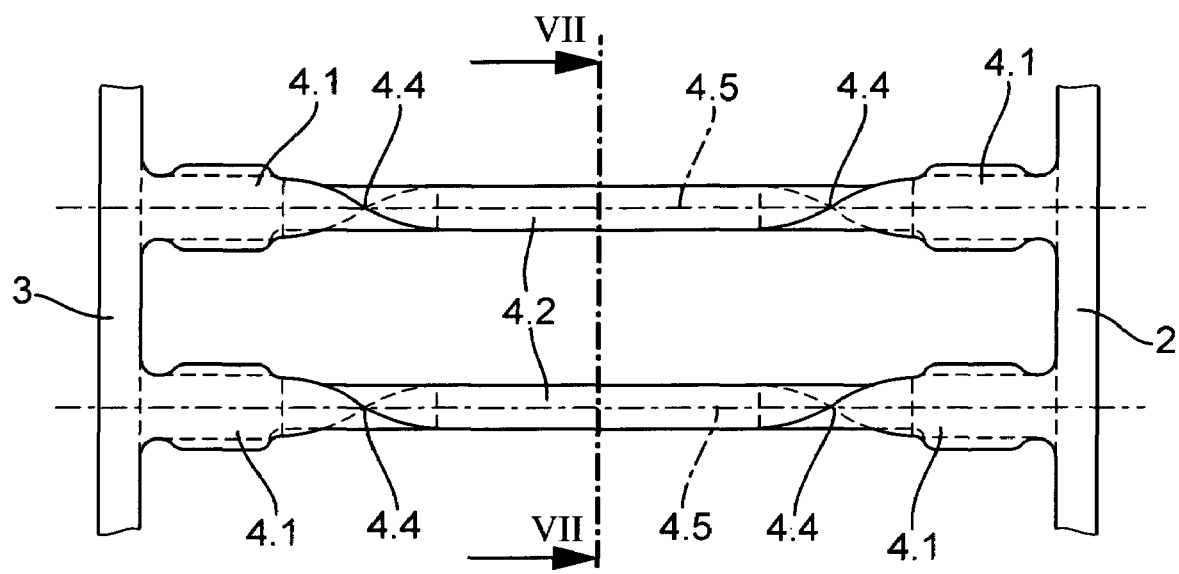
FIG. 6 shows a detail of a plan view of a sheet-metal strip with twisted web part.
Figure 7:
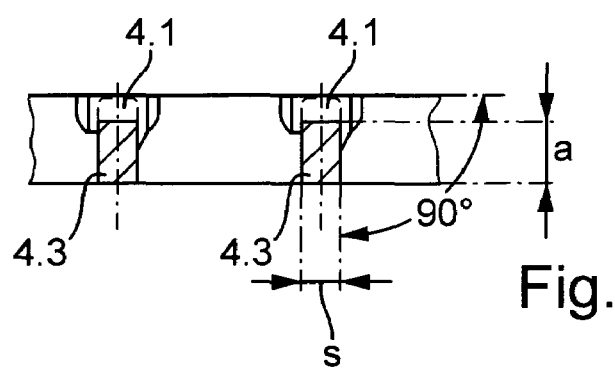
FIG. 7 shows a cross section along line VII-VII in FIG. 6.
Figure 8:
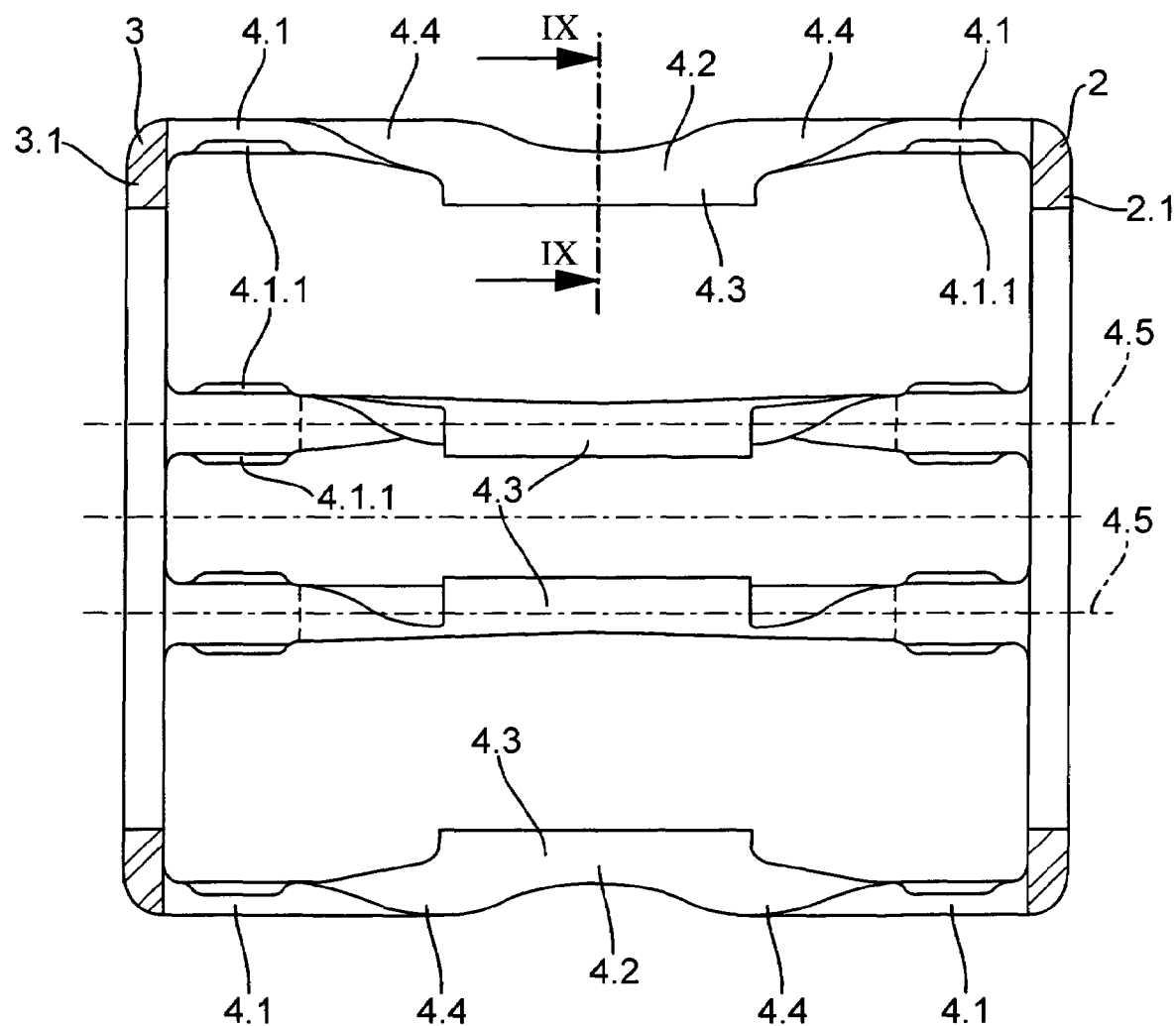
FIG. 8 shows a longitudinal section through a retainer designed according to the invention.

The same strip is shown once again in FIGS. 6 and 7, but with twisted web center part 4.2. As FIG. 7 shows, the web center part 4.2 has been twisted by 900 along its axial center line 4.5, so that the projection 4.3 assumes its radially oriented position. It can clearly be seen from FIG. 6 that the torsion caused by the twisting of the web center part 4.2 in the form of a spirally twisted bend is absorbed by the two web regions 4.4. The finished retainer 1 shown in FIG. 8 is produced by the strip being appropriately cut to length in accordance with the subsequent desired circumferential extent of the retainer 1, by being bent into a circular shape and by being welded together at its two ends.

Figure 10:
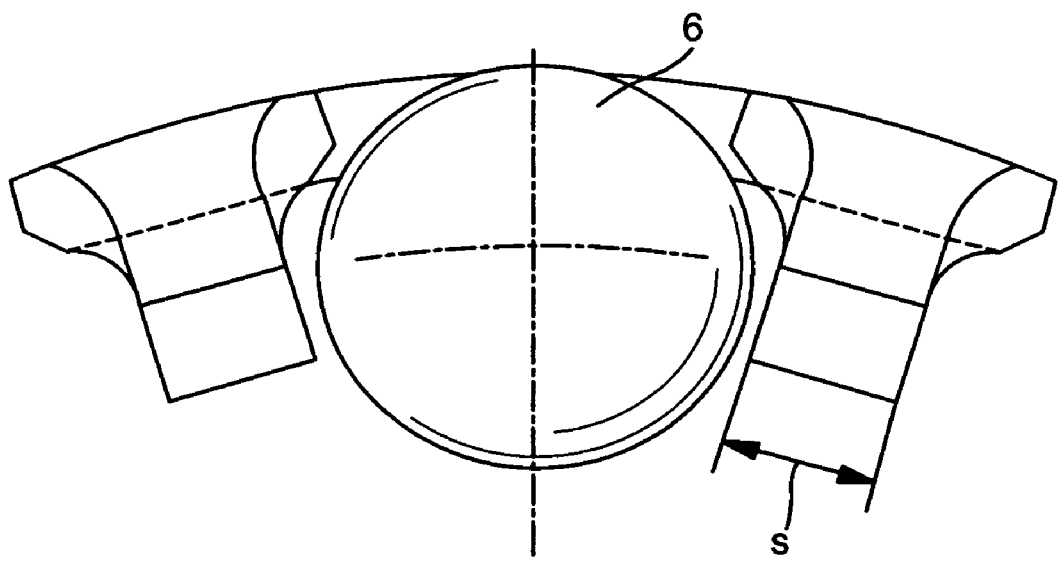
FIG. 10 shows a section along line IX-IX in a retainer according to the prior art.

It can be seen from FIG. 9 that the distance between the cylindrical rollers 6 is determined by the material thickness s of the holding lugs in the circumferential direction, whereas the stability of the retainer 1 is ensured by the material thickness a in the radial direction. This means that, despite a maximum number of cylindrical rollers 6 being accommodated in the retainer 1 due to the small material thickness s in the circumferential direction, its stability is not lost due to the material thickness a in the radial direction. It can clearly be seen from said figure that s<a. It can also be seen that the cylindrical rollers 6 are enclosed by the projections 4.3, formed into holding lugs, right into the region of the pitch circle R. A comparison of FIG. 9 with FIG. 10, which shows a detail of a retainer according to the prior art, clearly shows that its material thickness s in the circumferential direction is substantially greater than the material thickness s of a retainer 1 according to the invention. This means that, with otherwise the same dimensions of both retainers, more cylindrical rollers 6 can be accommodated in the retainer 1 according to the invention.

The invention claimed is:

1. A rolling bearing retainer for a cylindrical roller bearing, which rolling bearing retainer comprising two side rings which are connected to one another by axially running webs uniformly spaced apart in the circumferential direction, so that pockets are formed for accomodating cylindrical rollers, the webs being at least partly twisted by being rotated by about 90° about their longitudinal axes, so that the cylindrical rollers are prevented from falling out of the retainer, characterized in that wherein a respective projection is arranged in a center part of the webs on a circumferential side, and these projections, by twisting this web center part about its longitudinal axis, are formed into holding lugs which, with regard to a bearing center point, extend in the bent-over state beyond a pitch circle radius (R) and in each case separate two adjacent cylindrical rollers from one another and prevent the cylindrical rollers from falling out in a radial direction, these radially oriented holding lugs, via two respective twisted parts adjoining on both sides in the axial direction, being connected to a respective outer non-twisted web part, these web parts being arranged outside the pitch circle (R) and preventing the cylindrical rollers from falling out in the other radial direction and reduced in their thickness as compared with the other web parts.

2. The rolling bearing retained as claimed in claim 1, wherein it is formed from a sheet-metal strip, the ends of which, after the pockets.

3. The rolling bearing retainer as claimed in claim 1, is formed from a tubular hollow body whose pockets are stamped out and whose projections arranged on the webs are formed by twisting them into holding lugs.

4. The rolling bearing retainer as claimed in claim 1, is externally guided.

* * * * *